United States Patent [19]
van der Jagt

[11] 3,993,525
[45] Nov. 23, 1976

[54] METHOD OF MANUFACTURING A BALL-AND-SOCKET JOINT PARTICULARLY FOR DUCTS

[75] Inventor: Cornelis van der Jagt, Hoornaar, Netherlands

[73] Assignee: Seaking Engineering, Sen AG, Zug, Switzerland

[22] Filed: Nov. 6, 1975

[21] Appl. No.: 629,585

Related U.S. Application Data

[63] Continuation-in-part of Ser. No. 441,428, Feb. 11, 1974, abandoned.

[30] Foreign Application Priority Data

Feb. 9, 1973 Netherlands.................... 7301826

[52] U.S. Cl. .............................. 156/170; 156/173; 156/245; 156/285; 285/261; 285/293; 285/423
[51] Int. Cl.² .................... B31C 13/00; F16L 25/00
[58] Field of Search. 156/169, 170, 172, 173 175, 156/171, 408, 446; 285/261, 266, 293, 423, 182, 188, 285, 286, 245

[56] References Cited
UNITED STATES PATENTS

| | | | |
|---|---|---|---|
| 2,744,043 | 5/1956 | Ramberg............................ | 156/173 |
| 2,878,038 | 3/1959 | Noland ............................. | 156/171 |
| 3,276,796 | 10/1966 | Daniel............................... | 285/261 |
| 3,280,850 | 10/1966 | Gorcey et al. ................... | 156/172 |
| 3,386,872 | 6/1968 | Medney............................. | 156/173 |
| 3,697,346 | 10/1972 | Van Dorn et al.................. | 156/170 |
| 3,765,979 | 10/1973 | Thomas ............................ | 156/175 |
| 3,799,818 | 5/1974 | Bulters et al..................... | 156/171 |

FOREIGN PATENTS OR APPLICATIONS

7,301,826   8/1974   Netherlands

Primary Examiner—Douglas J. Drummond
Assistant Examiner—Michael W. Ball
Attorney, Agent, or Firm—Owen, Wickersham & Erickson

[57] ABSTRACT

A method of manufacturing a ball-and-socket joint particularly for use with pipe lines, which comprises a first coupling portion provided with a coupling rim and having a conical inner wall and a second coupling portion at least partly surrounding the first coupling portion and provided with a coupling rim and part of a spherical wall, the portions being connected with each other by means of a lock ring, the two coupling portions are separately made on a jig, the external dimensions of which correspond with the internal dimensions of the coupling portion concerned, for which purpose layers of crossing, continuous, resin-impregnated threads are wound around the jig, while said threads are at an acute angle to the longitudinal axis of the coupling portion concerned, in order to form the conical wall and the part of the spherical wall respectively.

16 Claims, 6 Drawing Figures

मेथड OF MANUFACTURING A BALL-AND-SOCKET JOINT PARTICULARLY FOR DUCTS

METHOD OF MANUFACTURING A BALL-AND-SOCKET JOINT PARTICULARLY FOR DUCTS

CROSS-REFERENCE TO RELATED APPLICATION

This application is a continuation-in-part of Ser. No. 441,428, which was filed on Feb. 11, 1974, now abandoned.

BACKGROUND OF THE INVENTION

The invention relates to a method of manufacturing a ball-and-socket joint particularly for use with pipe lines, comprising a first, flanged coupling part having a conical inner wall and a second, flanged coupling part, partially surrounding the former and forming part of a spherical wall, said parts being joined to each other with the aid of a lock ring.

Such ball-and-socket joints are employed, for example, in the dredging industry in ducts intended for the conveyance of spoil. The previously known ball-and-socket joints are made from metal. Therefore, these ball-and-socket joints are comparatively heavy and can be manipulated only with difficulty, whilst they are strongly exposed to corrosion. Moreover, the manufacture of such ball-and-socket joints from metal is difficult and hence expensive, whilst particularly after the couplings have been employed for some time the satisfactory pivotal movements between the two coupling parts often leave much to be desired.

SUMMARY OF THE INVENTION

The invention has for its object to provide a method in which ball-and-socket joints can be effectively manufactured, whilst the aforesaid disadvantages are obviated or at least materially reduced.

According to the invention this can be achieved by manufacturing the two coupling parts separately on separate jigs, the external dimensions of which match the internal dimensions of the relevant coupling parts, for which purpose layers of crossing, continuous, resin-impregnated or resincoated filaments, arranged at acute angles to the longitudinal axis of the coupling part concerned, are wound around the jig to form the conical wall and the wall forming part of a sphere respectively.

In this way, by using comparatively simple manufacturing techniques, a comparatively lightweight ball-and-socket joint can be effectively made, the strength of which is surprisingly sufficiently high to withstand the forces exerted in said usually very rough operations, whilst even after long use the coupling satisfies the normal requirements.

The method used has a further, practical advantage in that it is simply possible to provide different colors for the couplings so that, for example, individual clients may obtain differently colored couplings, which will prevent exchanges of couplings which may occur when couplings from different manufacturers are mixed in stock.

The invention will now be described hereinafter more fully with reference to embodiments shown in the accompanying figures.

BRIEF DESCRIPTION OF THE DRAWINGS

In the drawings:

FIG. 5 is a view in side elevation of the jig which may be used for making one of the two coupling members.

FIG. 6 is a view in side elevation of a jig which may be used for making the other of the two coupling members.

DESCRIPTION OF A PREFERRED EMBODIMENT

Figure 1:
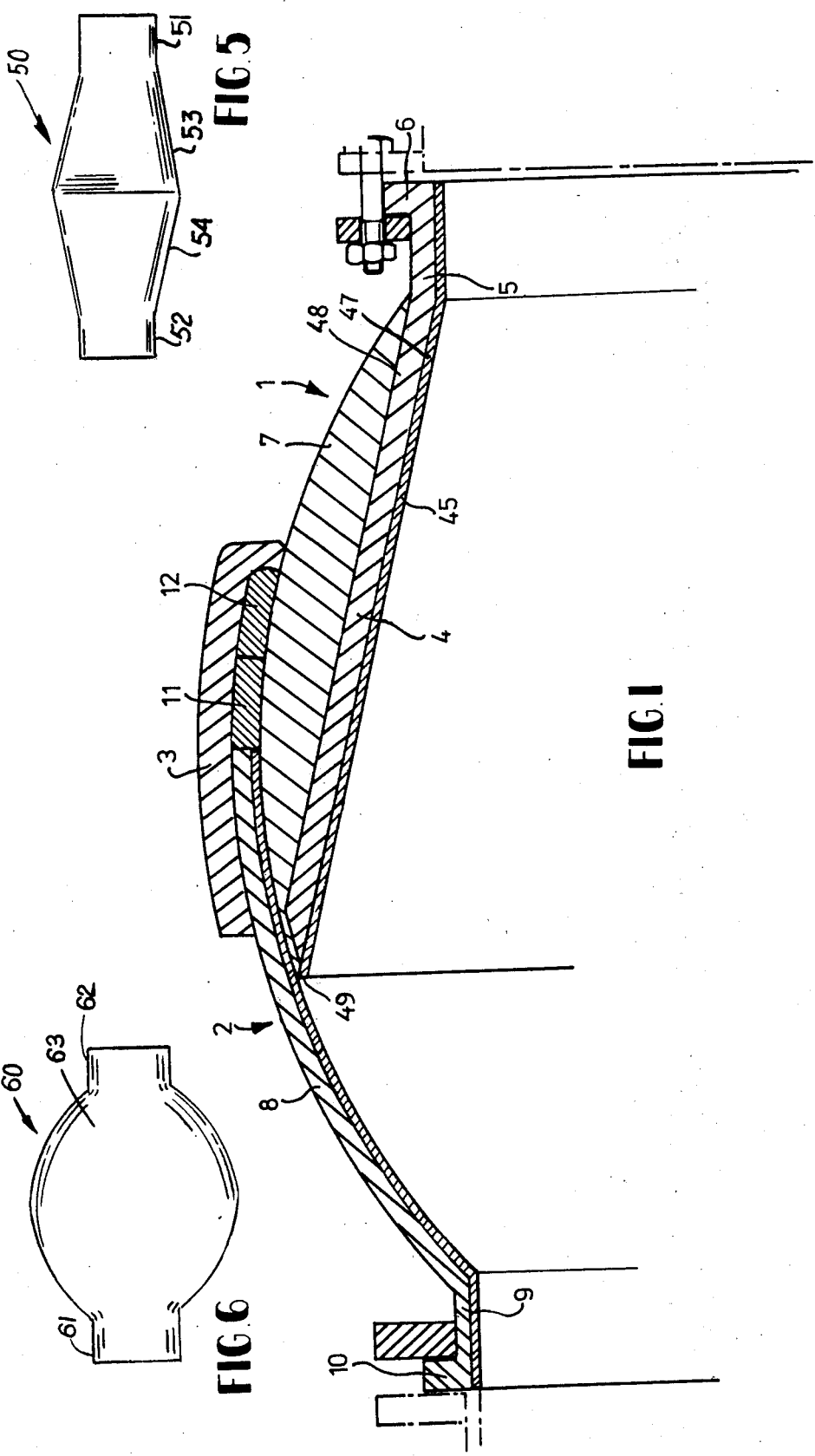
FIG. 1 shows part of a ball-and-socket joint in accordance with the invention in a sectional view.

Referring to FIG. 1, the ball-and-socket joint comprises two coupling portions 1 and 2, connected with other by means of a closing ring 3.

The first coupling portion 1 has a mainly conical inner passage bonded by a conical inner wall 4, which is connected at its narrowest end by means of a cylindrical intermediate piece 5 with a radial flange 6. A differently shaped coupling rim may also be used.

Around the conical inner wall 4 is arranged a filling body 7 consisting at least mainly of a mixture of resin and a filler, for example, sand. The outer surface of the filling body forms a spherical-segment surface.

The second coupling portion 2 comprises a wall 8 forming a spherical segment and having an inner diameter corresponding with the outer diameter of the spherical surface of the body 7. The wall 8 is joined by a cylindrical intermediate piece 9, which establishes a connection between the wall 8 and a radial flange 10. As the drawing shows, the spherical-segment stops at its widest extent, just before the arc turns inwardly relative to the cylindrical portion 9. After the first coupling portion is placed inside the second coupling portion, two adjacent rubber rings 11 and 12 are placed next to the free end of the wall 8. These rubber rings 11 and 12 surround a portion of the filling body 7 and have a thickness corresponding at least substantially with the thickness of the wall 8, whilst the width of each rubber ring 11 or 12 is approximately three to four times the thickness of the rubber ring.

The annular closing piece 3 (lock ring) has a substantially L-shaped sectional area, the short limb of the L (see FIG. 1) extending radially outwardly along the edge of the rubber ring 12 remote from the coupling portion 2 and transversely of the outer surface of the filling body 7, whereas the long limb of the L-shaped sectional area extends in a spherical segment around and along the outer circumference of the rubber rings 11 and 12 and the outer circumference of the adjacent part of the spherical wall 8. The closed ring 3 prevents the two coupling portions 1 and 2 from moving axially away from each other since (see FIG. 1) the closing ring 3 extends on either side of a plane at right angles to the plane of the drawing and passing through the common center of the various spherical surfaces.

For the manufacture of the two coupling portions described above the device shown in FIGS. 2 to 4 is employed.

The device comprises a frame 13, which is held by ground wheels 14 on rails 15, along which it can travel to and fro and/or with respect to which it can be fixed in position.

The frame is provided with supports 16, on which bearings 17 are arranged for holding a horizontal shaft 18 extending at right angles to the direction of length of the rails 15.

To one end of the shaft 18 is fastened a connecting piece 19, by means of which the shaft 18 is connected with a stub shaft 20 in line with said shaft 18 and journalled in a further bearing 17 and having at its free end a pinion 21.

With the aid of a pivotal shaft 22 at right angles to the shaft 18 the connecting piece 19 has pivotally connected with it an arm 23, which is adjustable along the pivotal shaft 22 with the aid of a setting cylinder 24 with respect to the connecting piece 19.

The pinion 21 engages a toothed rack 26 forming part of a horizontal shaft 25, extending at right angles to the center line of the shaft 18.

The shaft 25 is displaceable in its direction of length and journalled in bearings 27, fastened to the frame 13. To the shaft 25 are fastened two downwardly extending arms 28, between which a sliding block 29 is arranged so as to be slidable up and down between the arms 28. The sliding block accommodates a stub shaft 30, extending parallel to the shaft 18 and being coupled with the aid of a connecting member 31 with a shaft 32, journalled in the frame and extending parallel to the stub shaft 30 and adapted to be driven by means of a motor 33.

It will be obvious that when the connecting member 31 is rotated by means of the shaft 32 the stub shaft 30 will describe a circular path and will move up and down between the guides 28 so that the shaft 25 with the toothed rack 26 is compelled to reciprocate in a horizontal direction. This finally results in a reciprocatory swinging motion of the arm 23 about the center line of the shaft 25. There is preferably provided a transmission member between the shaft 32 and the motor 33 for continuous control of the number of rotations of the shaft 32. The connecting member 31 is constructed so that the distance between the center line of the stub shaft 30 and the center line of the shaft 32 can be continuously regulated.

The frame is provided with further means for holding a plurality of bobbins 33a provided with filaments, i.e., threads or wires. Above the bobbins 33a is arranged a trestle 34 having guide wheels 35 for the threads or wires 36 emanating from the bobbins, the guide wheels 35 being adapted to rotate about rotary shafts extending parallel to the center line of the shaft 18. From the guide wheels the threads or wires 36 emanating from the bobbins 33a can be guided along guide wheels 37, arranged beneath the shaft 18 and by guide members not shown in detail and coinciding at least substantially with the center line of the shaft 18 towards guide wheels 38 on the arm 23 and from there in between guide wheels 39 arranged on the free end of the arm 23.

On the side of the guide wheels 39 remote from the arm 23 a holder (not shown) is arranged on the arm, said holder containing resin for coating the threads or wires and being constructed so that a plurality of separately fed threads or wires are urged towards each other by means of guides inside the holder so that the threads or wires emanate from the holder in the form of a think strand of parallel threads or wires.

To said holder are fed the resin constituents from vessels 40 arranged on the frame through ducts 41.

Figure 2:
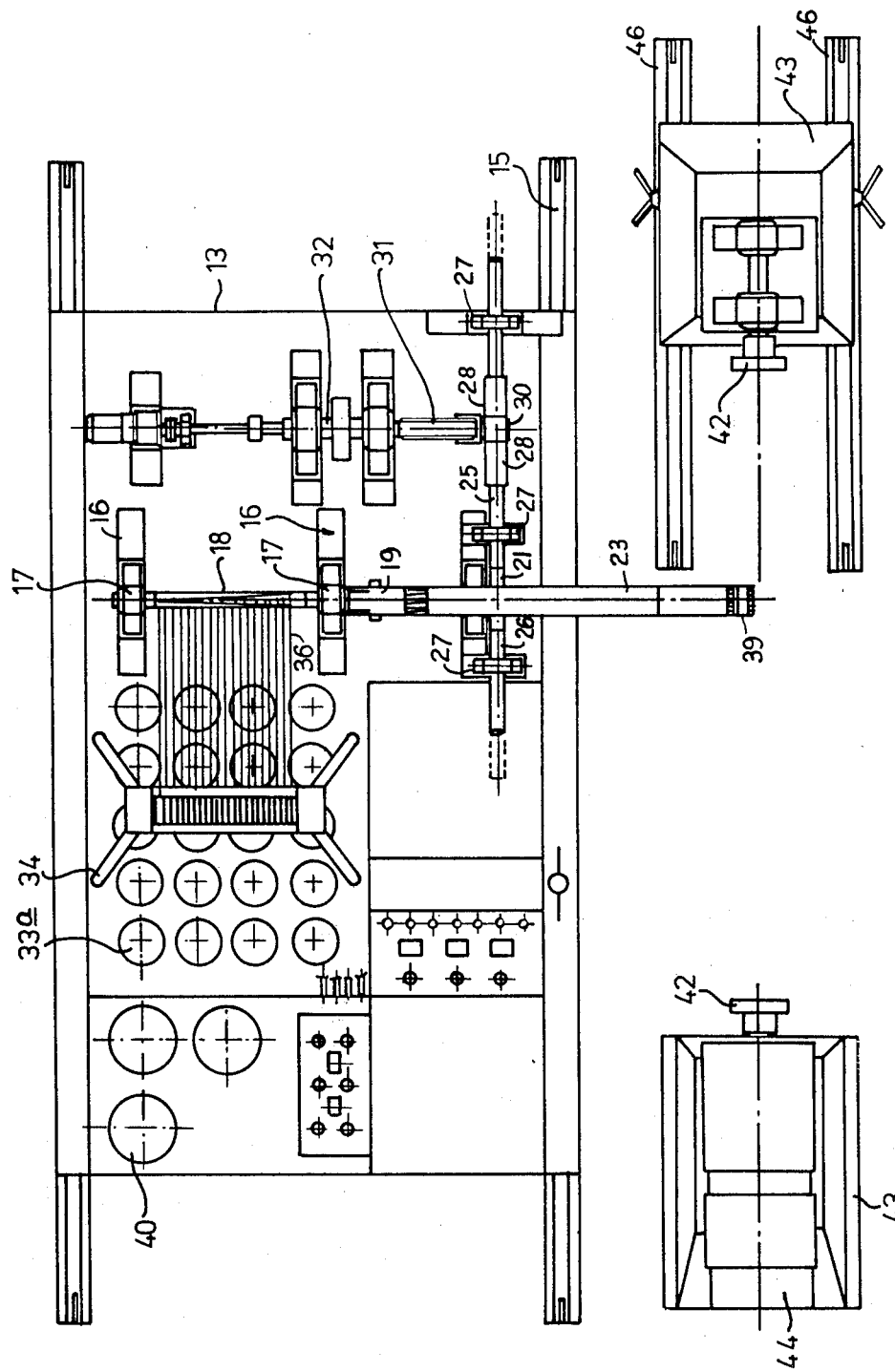
FIG. 2 is a schematic plan view of a winding device.
Figure 3:
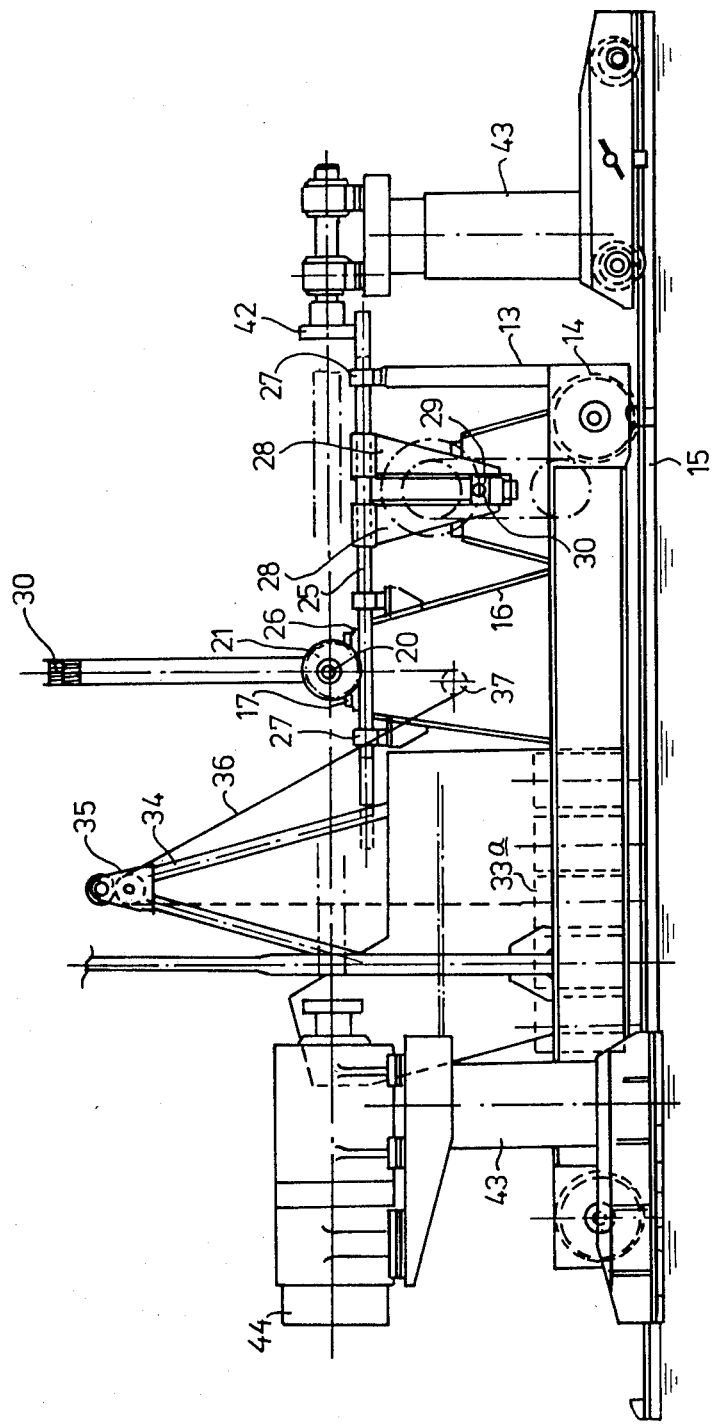
FIG. 3 is a front view of the winding device shown in FIG. 2.
Figure 4:
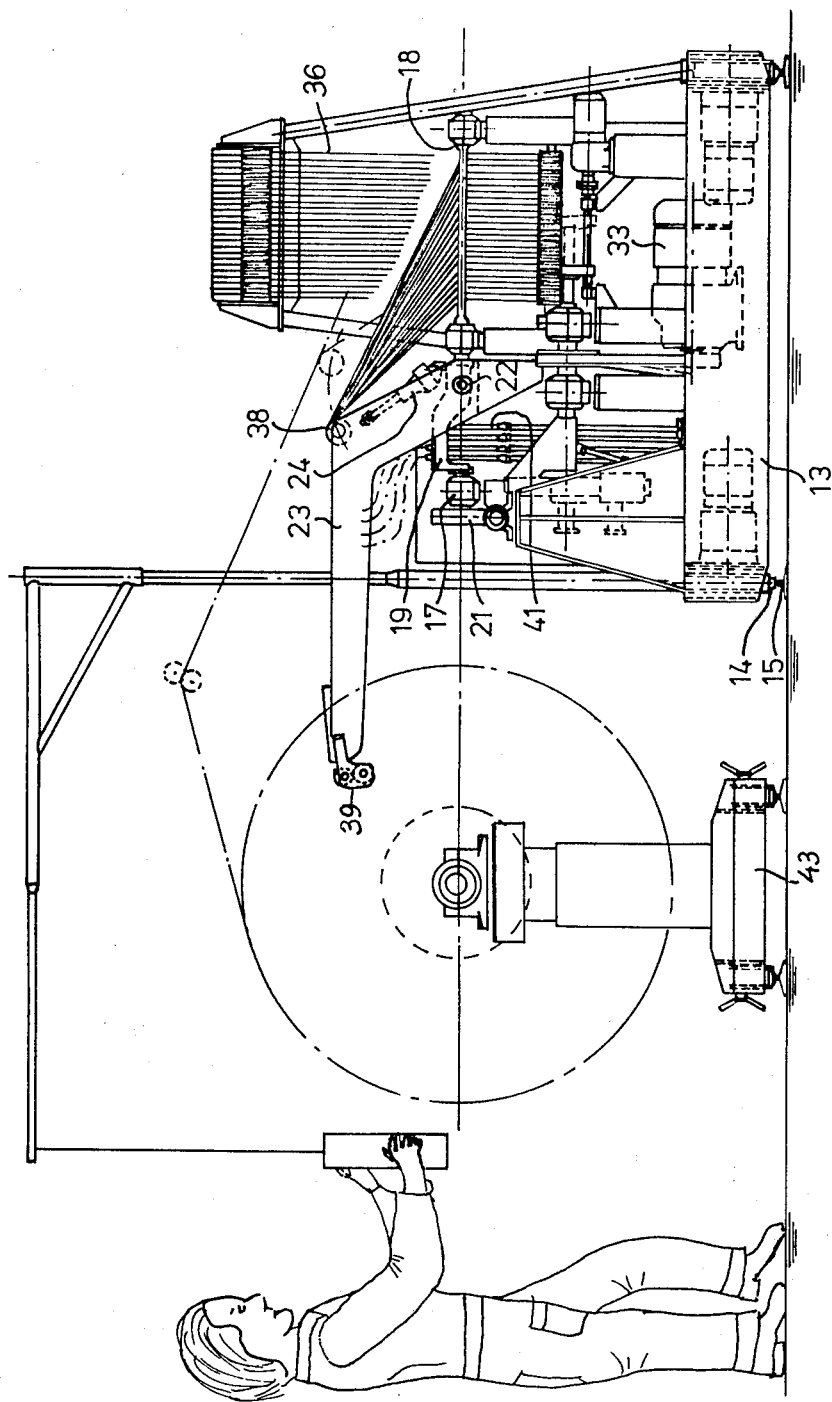
FIG. 4 is a side elevation of the device of FIG. 3.

An object, such as a jig 50 of FIG. 5 or a jig 60 of FIG. 6, which is to be wound with the aid of the winding device of FIGS. 2–4 can be clamped between the supporting plates 42, which are adapted to rotate relatively to aligned rotary shafts and form part of the supports 43, one of which (see FIG. 3) can be moved along rails 46 and be fixed in a plurality of positions.

From FIG. 3 it will furthermore be apparent that the aligned rotary shafts of the supporting plates 42 are at right angles to the aligned center lines of the stub shaft 20 and of the shaft 18, all of these center lines being located in a common horizontal plane. The object clamped between the supporting plates 42 can be rotated by means of a motor 44, arranged on the stationary support 43, the construction being preferably such that the number of rotations of the object to be wound is continuously controllable. In a conventional manner actuating means are provided for operating the device and regulating the number of rotations and the movements of the various moving parts. For winding an elongated, cylindrical object the arm 23 will preferably be arranged in the position shown in the Figure, whilst in accordance with the diameter of the object to be wound the arm can be adjusted further by turning it about the pivotal shaft 22. The object to be wound is rotated, and the frame 13 is reciprocated. The threads or wires are automatically drawn off the bobbins 33a by the object to be wound. Filament stretchers (not shown) are provided for keeping the various threads or wires in the taut state.

For winding a spherical surface the frame 13 is fixed in place, whilst the arm is swung in a reciprocatory manner about the registering center lines of the shaft 18 and the stub shaft 20, the magnitude of the angle of this turn depending upon the size of the spherical surface.

The inner walls 4 of two first coupling portions 1 may be made integrally and then sawn apart at the place where the conical wall parts meet each other at their ends having the larger diameters. A jig 50 of corresponding shape having two cylindrical portions 51 and 52 and two flaring frustoconical portions 53 and 54 that meet each other) is clamped between the two supporting plates 42 and coated with a mold-release or loosening agent, after which a wear-resistant layer 45 of a synthetic resin of a thickness of, for example, 6 mms, is sprayed onto the jig 50. Subsequently, the winding device is actuated and the number of rotations of the jig 50 clamped between the supporting plates 42 and rotated by the motor 44 is adjusted relatively to the drive of the winding arm 23 so that with two revolutions of the jig 50 the arm 23 performs one forward stroke and one backward stroke, the magnitude of the stroke being adjusted so that a plurality of, preferably, steel, resin-coated wires joined into a strand in the manner described above are wound around the jig 50, for example, steel wire of a diameter of 0.22 mm.

With regard to the resin which is useful herein, an advantageous material is a resin resistant to wear under the projected conditions of use. Such a resin is, for example, made up of a mixture of Deracane 441-45 (a vinyl ester resin produced under this trademark by Dow Chemical Co.) with sufficient Isobutanix (available under this trademark from Noury Van Der Lande, Netherlands) as curing agent for the vinyl ester resin, and a plasticizing amount of cobalt octanoate. The formulation of such resin as described above is known to those skilled in the art. Alternatively, there can be used another resin, such as an epoxy resin with a suitable plasticizer or other additives, if desired. The choice of resins and formulations, as well known in such art, is available to those skilled in the art, once the teaching of the formation and projected use of a ball-and-socket joint, as claimed herein, is known. The resins useful as wear-resistant materials are also useful as impregnants for the wire filaments.

In general, in order to obtain a satisfactory adherence between the wear-resistant layer 45 and the resin-impregnated threads a glass fiber mat 47 is placed at the interface around the outer circumference of the wear-resistant layer 45. The glass fiber mat 47 may be a mat of non-woven, short arbitrarily orientated glass fibers of a weight of, for example, 450g/m², impregnated with the material of the wear-resistant layer 45, diluted with the resin coating for the wires.

It has been found that by using the winding method described above a uniform structure of the outer part 48 of the conical wall portion 4 surrounding the wear-resistant layer 45 can be obtained, particularly when care is taken that every two revolutions of the jig winding arm 23 performs at least substantially one forward and one backward stroke, whilst it is ensured that the number of rotations of the jig 50 slightly lags or leads with respect to the number of strokes of the winding arm 23, in order to ensure that one turn arrives at the side of the preceding turn. The outermost edges may tend to become slightly thicker, but this may be compensated for by slightly reducing the magnitude of the reciprocatory stroke during the winding operation. After having empirically determined the correct movements, the whole control may be carried out automatically.

During winding the conical wall part, the filamentary reinforcement for the cylindrical parts 5 and the flanges 6 is simultaneously provided. For this filamentary reinforcing a so-called "wire-sheet" is preferably used, which is formed by sheets of relatively adhering parallel steel wires of a diameter of about 0.25 mm. Before applying the wire sheet it is pre-shaped so that the wires of the various sheets extend parallel to each other in the cylindrical part 5 and parallel to the longitudinal direction of the cylindrical part 5, whilst the ends on one side are bent over at right angles for insertion into the flanges 6, whilst they then extend slightly in a fan-shaped fashion, whereas the other ends are slightly inclined for insertion between the various winding layers during the winding operation, said wires then also extending slightly in a fan-shaped fashion. In general, seven to 10 layers of wire-sheet will be stacked on one another, and in order to obtain the desired thickness of the cylindrical parts, glass wire, preferably woven glass wires, so-called woven roving, having a weight of, for example 450 g/m² may be arranged between the wire-sheet layers.

After the completion of the body formed by the two conical inner walls, this body is divided in half by sawing along the edge 49, and each body is removed from the jig 50 and placed in a molding jig, the inner circumference of which corresponds with the outer circumference of the first coupling portion as shown in FIG. 1, so that both the space to be occupied by the filling body 7 and the space occupied by the cylindrical portion 5 and the flange 6 are located in the molding jig. That part of the molding jig which bounds the space intended for the filling body 7 is preferably coated with a layer of woven glass fiber (Roving) of the aforesaid composition and two layers of glass mats of the composition described above. The purpose is to obtain finally an impact-resistant outer wall of the filling body, since in some cases the filler-resin composition may not be sufficiently impact-resistant.

After the disposition of the molding jig, the space intended for the formation of the filling body 7 is filled substantially completely with a filling agent and subsequently, whilst applying a vacuum, resin is impregnated in the molding jig from the side remote from the flange 6, the impregnation being continued until the resin has penetrated completely into the cylindrical connecting member 5 and the flange 6. Then the first coupling portion is ready after the resin has hardened.

In a similar manner the second coupling portion 2 is manufactured, also by making two of these coupling portions 2 integrally on a jig 60 (FIG. 6) having two cylindrical portions 61 and 62 and a spherical segment 63, after which the resultant body is cut into halves. Instead of winding steel wire around the jig 60, as is required for the conical inner wall in order to obtain a sufficient rigidity, it is frequently sufficient for the spherical wall 8 of the second coupling portion 2 to use glass threads, and they will ensure sufficient strength. The reinforcing or armouring of the cylindrical intermediate piece 9 and the flange 10 is accomplished in a manner similar to that of the reinforcing of the cylindrical intermediate piece 5 and the flange 6. In contrast to winding of the conical parts, the winding arm 23 performs one reciprocatory stroke per revolution of the jig 60, when winding the spherical body 8, whilst a given leading or lagging is ensured in order to have the turns disposed side by side. After winding, the resultant body is sawn in two to give two second coupling portions 2.

After the spherical part 8 is completed, another jig is arranged around the armouring of the cylindrical intermediate piece 9 and the flange 10, into which jig resin is injected for obtaining the desired shape and structure of the cylindrical intermediate piece 9 and the flange 10.

After the two coupling portions 1 and 2 have been completed, they are assembled, whilst being supported in a proper manner, in the manner shown in FIG. 1, after which the rubber belts 11 and 12 are applied also in the manner shown. Subsequently, this assembly is clamped in the winding device and rotated for making the closing ring 3. Winding of the closing ring 3 is performed in the same manner as the winding of the spherical wall portion 8, in which case, however, the reciprocatory stroke of the winding member is, of course, smaller than in the manufacture of the two joined, spherical wall portions 8. With a view to the required strength, steel wire of a diameter of 0.22 mm will also be used for winding the endless ring 3, in which case as described above and as performed in winding the two coupling portions, a plurality of resin-coated wires are assembled to form a thin strand, which strand is wound around the jig. The two coupling portions 1 and 2 thus form, in fact, the jig for the ring 3.

In order to ensure that after completion the assembly has sufficiently play for allowing a suitable pivotal movement, a thin layer of paraffin of a thickness of, for example, 0.2 mm is sprayed onto the first coupling portion 1 before the first coupling portion 1 is inserted into the second coupling portion 2, which layer can be removed by heating after the completion. In order to avoid affecting of the rubber rings 11 and 12 by the resin impregnating the metal wires wound around the rings, a thin synthetic foil (Melinex) of a thickness of, for example 19µ is applied to the rubber rings 11 and 12, which are thus protected.

In practice it has been found that during winding, the L-shape of the closing ring 3 is automatically obtained, also because the wires slightly tend to hook around the free edge of the rubber strip 12, whilst yet a satisfactory stacking of the short limb 55 of the L-shaped section with steel wires is obtained. If necessary, during winding of the ring 3, detachable enclosing rings may be arranged on the two coupling portions 1 and 2 for limiting the ends of the closing ring 3.

In the manner described above, an effective ball-and-socket coupling can be manufactured in a simple manner and by using suitable materials satisfactory proportions of sizes can be ensured. For the construction of the spherical wall portion 8 described above glass threads are used, whereas for the construction of the conical wall portions 4 the stronger steel wire is employed, since the loads occurring in the latter portion are higher. In accordance with the properties other materials, for example, carbon fiber threads may be employed, if the loads occurring in operation allow the same. The use of the rubber rings described above and shown in FIG. 1 permits of winding the closing rings 3 without any difficulty. Since the rubber is deformable but not compressible, these rubber rings can transfer the forces exerted on the first coupling portion to the closing ring 3. If forces are exerted on the coupling portions in axial direction, the outer wall of the filling body 7 will be firmly pressed against the rubber rings, so that a satisfactory seal is made in contrast to the prior art structures in which the closing ring is usually located in a plane going through the center of the pivot so that, when the ball-and-socket joint portions are displaced axially, the ring is loosened instead of being tightened. Moreover, small deviations from the spherical shape can be compensated for by the rubber, which also contributes to a satisfactory seal.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method of manufacturing a pipeline ball-and-socket joint wherein a first coupling portion with a frustoconical inner wall and a spherical-segment outer wall is at least partially surrounded by a second coupling portion with a spherical-segment wall, and the two coupling portions are locked together by means of a lock ring, said method comprising the following steps:
    making said first and second coupling portions separately by winding layers of crossing, continuous, resin-coated filaments around respective jig means having external dimensions such as to provide a said first coupling portion having a short cylindrical inner wall succeeded by an outwardly flaring frustoconical inner wall and to provide a said second coupling portion with a short cylindrical wall succeeded by a widening spherical-segment wall terminating at its widest extend just before the spherical segment would begin to curve inwardly, said filaments for each said coupling portion being wound at an acute angle to the longitudinal axis of each coupling portion concerned,
    surrounding said frustoconical inner wall of said first coupling portion with an annular filling body the outer surface of which is a spherical segment matching the inner surface of the spherical-segment wall of said second coupling portion,
    placing said first coupling portion inside said second coupling portion with their respective spherical-segment surfaces in partial engagement,
    placing at least one wide rubber ring around a non-engaging portion of said filling body of said first coupling portion and in abutment with the end of said second coupling portion, the thickness of said ring being substantially equal to the thickness of the spherical-segment wall of said second coupling portion,
    forming said lock ring by winding resin-coated filaments around said rubber ring and an adjacent part of said spherical wall of said second coupling portion while shaping said lock ring as a generally L-shaped section having a short radially extending portion along the edge of the rubber ring more remote from said second coupling member and transversely to the outer surface of said filling body and a longer portion extending in a curve along the outer periphery of said rubber ring and the adjacent part of said spherical-segment wall of said second coupling member.

2. A method as claimed in claim 1 characterized in that during each said winding step a plurality of said filaments is applied in the form of a strand.

3. A method as claimed in claim 1 characterized by, before said winding of filaments to make said first and second coupling portions,
    coating each said jig with a mold-release agent,
    then applying a wear-resistant layer of synthetic resin to said coated jig, and
    then applying a glass mat layer around the jig over said wear-resistant layer, said glass mat having been impregnated before application with the material forming the wear-resistant layer diluted with the resin for coating said filaments.

4. A method as claimed in claim 1 in which the small end of the frustoconical inner wall of said first coupling member and the small end of the spherical-segment wall of said second coupling member are connected through cylindrical intermediate portions with coupling rims of the coupling portions concerned, characterized by forming said intermediate portions by providing threads extending in the direction of the longitudinal axes thereof, so that the ends of said threads are clamped in between layers surrounding said jig during the winding operation, while shaping said intermediate portions so that the ends extend radially outwardly to form a coupling rim.

5. A method as claimed in claim 4 characterized by applying the threads to said intermediate portions parallel to each other with their ends arranged in fan-shaped fashion between the wound layers and in the coupling rim respectively.

6. A method as claimed in claim 4 characterized in that said filaments are made of metal and said threads are made of glass.

7. A method as claimed in claim 6 characterized by applying woven glass mats in between stacked layers of metal wires.

8. A method as claimed in claim 4 characterized by, after the completion of the step of winding said coupling portions, placing another jig around an intermediate portion to be formed and a coupling rim joining said intermediate portion, applying armouring between said jig and said coupling portion, and impregnating with resin the armouring of said intermediate portion and of the coupling rim.

9. A method as claimed in claim 1 characterized by forming the outer side of the filling body from resin-impregnated glass fiber material.

10. A method as claimed in claim 9 characterized by forming said outer side layer of resin-impregnated glass fiber, including as viewed from the exterior to the interior, first applying a woven glass fiber mat and then applying two mats of arbitrarily oriented, non-woven short glass fibers.

11. A method as claimed in claim 1 characterized by, prior to the step of surrounding said frustoconical wall with the filling body, placing another jig around said frustoconical outer wall, filling said other jig with a filling agent, exerting a vacuum on the cavity in the jig and impregnating the filling agent with resin.

12. A method as claimed in claim 11 characterized by forming said other jig so that both the reinforcing of an intermediate portion and of a coupling rim are provided for inside the jig, said reinforcing being impregnated with resin simultaneously with the filling agent.

13. A method as claimed in claim 1 characterized by, prior to the insertion of the first coupling portion into the second coupling portion, spraying the outer circumference of the first coupling portion with a thin layer of paraffin.

14. A method as claimed in claim 1 characterized by, prior to winding said lock ring, applying to the outer side of the rubber ring a thin synthetic resin foil which is insensitive to the effect of the resin coating the filaments of the closing ring.

15. A ball-and-socket joint obtained by the method of claim 1.

16. A method of manufacturing a pipeline ball-and-socket joint wherein a first coupling portion with a coupling rim, a frustoconical inner wall, and a spherical-segment outer wall is at least partially surrounded by a second coupling portion with a coupling rim and a spherical-segment wall, and the two coupling portions are locked together by means of a lock ring, said method comprising the following steps:

making said first and second coupling portions separately and each in pairs by winding layers of crossing, continuous, resin-coated filaments around respective jig means having external dimensions such as to provide two facing said first coupling portions each having a short cylindrical inner wall succeeded by an outwardly flaring frustoconical inner wall abutting at its end the outwardly flaring frustoconical inner wall of the other said first coupling portion and to provide two said second coupling portions each having a short cylindrical wall succeeded by a widening spherical-segment wall meeting the other said second coupling portion at the widest extent of said spherical segment, said filaments for each said coupling portion being wound at an acute angle to the longitudinal axis of each coupling portion concerned, sawing in two said pair of said first coupling portions and sawing in two said pair of second coupling portions, surrounding said frustoconical inner wall of each said first coupling portion with an annular filling body the outer surface of which is a spherical segment matching the inner surface of the spherical wall of a said second coupling portion, placing each said first coupling portion inside a said second coupling portion with their respective spherical-segment surfaces in partial engagement, placing at least one wide rubber ring around a nonengaging portion of said filling body of each said first coupling portion and in abutment with the end of the said second coupling portion, the thickness of each said ring being substantially equal to the thickness of the spherical-segment wall of said second coupling portion, forming each said lock ring by winding resin-coated filaments around the rubber ring and an adjacent part of the spherical wall of each said second coupler element while shaping said lock ring as a generally L-shaped section having a short radially extending portion along the edge of the rubber ring more remote from said second coupling member and transversely to the outer surface of said filling body and a longer portion extending in a curve along the outer periphery of said rubber ring and the adjacent part of said spherical-segment wall of said second coupling member.

* * * * *